Patented Jan. 10, 1928.

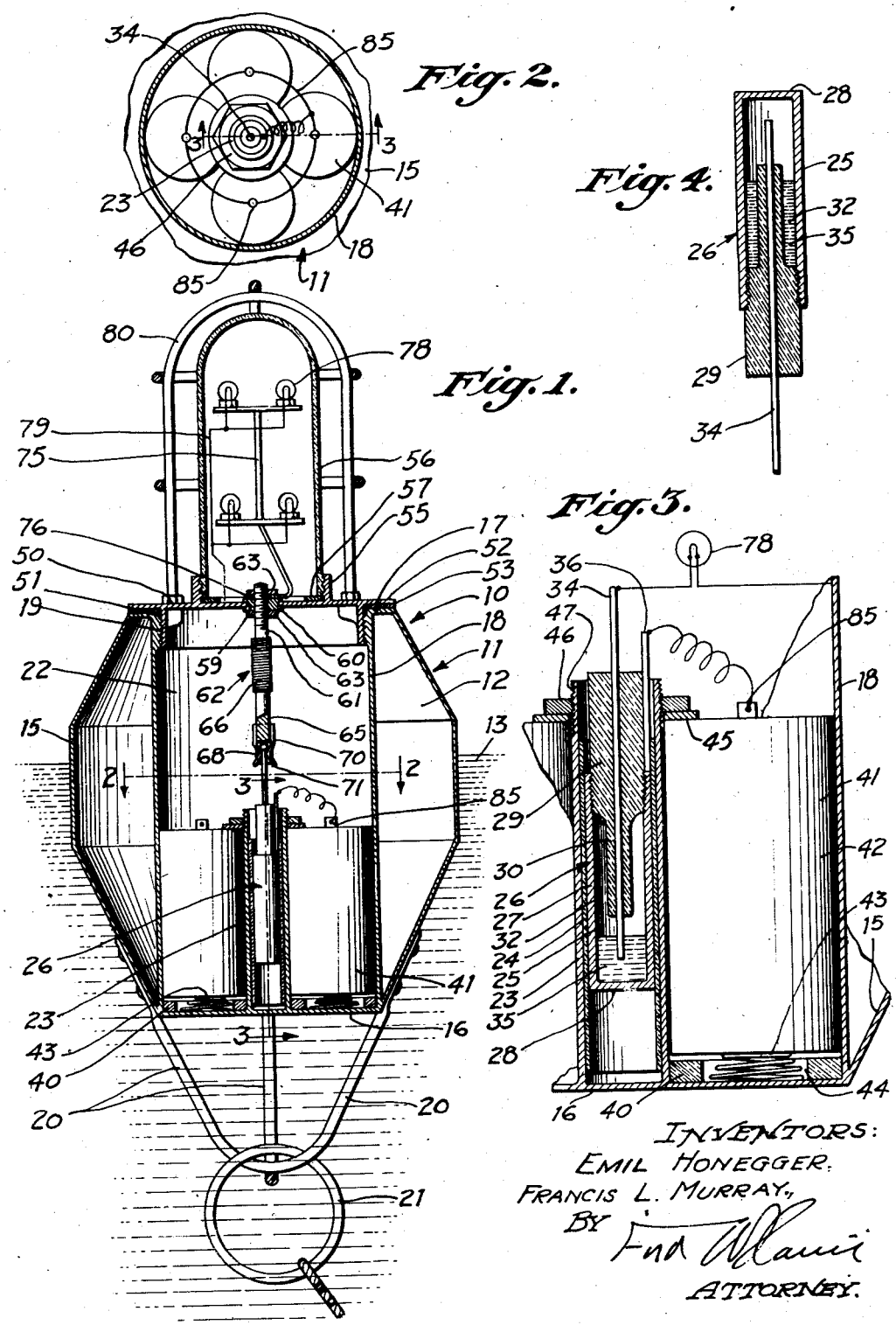

1,655,548

UNITED STATES PATENT OFFICE.

EMIL HONEGGER AND FRANCIS L. MURRAY, OF MARTINEZ, CALIFORNIA.

ILLUMINABLE BUOY.

Application filed April 26, 1926. Serial No. 104,530.

Our invention relates to floating buoys, and more particularly to an illuminable buoy.

Our invention is useful wherever a lighted buoy is beneficial but it is particularly useful in the fishing industry where it is frequently necessary to have lighted buoys ready on the deck of a fishing boat, which are secured to a portion of the fishing seine under certain emergency conditions which require the location of that portion of the seine to be constantly visible to the fishermen throughout the remainder of the fishing operations. The times at which the use of these buoys may become necessary are not always possible to be foreseen.

A floating buoy to which a person might cling for support is often valuable as a life-saving means. Since accidents frequently happen in the night-time, it is of great value to have such a buoy which, when thrown into the water, will be provided with a light which will direct the swimmer to the location of the buoy. Buoys provided for this purpose in the past have either been constantly lighted in readiness for use or they have required mechanical manipulation of a switch mechanism upon the buoy to effect their illumination before they are cast into the water. Since these buoys are primarily of value in an emergency, the necessity for such a manipulation in order to make the lighting apparatus effective is likely to cause loss of time due to excitement by the person desiring to render assistance to a swimmer in the water.

It is therefore an object of our invention to provide an illuminable buoy in which the lighting apparatus is normally inoperative when the buoy is stored in readiness for use but which is automatically lighted when thrown into the water.

It is another object of our invention to provide an illuminable buoy which has electrical illuminating means incorporated therewith, the circuit of this illuminating means having a unique gravity switch which completes this circuit when the buoy is disposed in a supporting liquid.

It is a further object of our invention to provide an illuminable buoy having superior features of construction which permit the easy assembly of this buoy as explained in this specification.

Further objects and advantages will be made evident in the following specification and in the accompanying drawing in which:

Fig. 1 is a vertical sectional view of the illuminable buoy of our invention.

Fig. 2 is a horizontal sectional view taken on the line 2—2 of Fig. 1.

Fig. 3 is a vertical sectional view taken on the line 3—3 of Fig. 2.

Fig. 4 is an inverted vertical sectional view of the mercury switch of our invention similar to the view of this switch shown in Fig. 3.

Referring specifically to the drawing, the buoy 10 illustrated in Fig. 1 has an outer metallic shell 11 which provides an enclosed air space 12 of sufficient size to cause the buoy 10 to float upright in a liquid 13, in which it may be emerged, in the position in which it is shown in Fig. 1. The shell 11 has outer walls 15, a lower floor 16 and an upper annular wall 17. Secured within the inner edge of the annular wall 17 is a cylindrical inner shell 18 which is provided with threads 19 at the upper end thereof and which is integrally secured at the lower end to the outer wall 15 and the floor 16 at their line of juncture. Bails 20 are rigidly secured to the lower portion of the outer wall 15 of the shell 11 and a ring 21 is looped through the lower ends of the bails 20, as shown in Fig. 1, to provide a securing means for the buoy.

Centrally provided in a chamber 22 formed within the inner shell 18 is a cylindrical switch receptacle 23 which is integral at its lower end with the central portion of the floor 16 and extends upwardly therefrom a given distance as shown in Fig. 1 and Fig. 3. Within the switch receptacle 23 is provided a cylindrical insulating shell 24 and inside the insulating shell 24 there is disposed, with a pressed fit, a metallic switch cup 25 of a mercury switch 26. The switch cup 25 has side walls 27 and a bottom wall 28. The mouth of the switch cup 25 is threaded to receive an insulated plug 29. The plug 29 has an extension 30 provided at the lower end thereof which is smaller in diameter than the inside of the cup 25 so as to provide a space 32 between the projection 30 and the cup walls 27. The plug 29 is centrally apertured to receive an electrode 34 which extends downwardly in the cup 25 to within a given distance of the bottom 28 thereof. A quantity of mercury or some other suitable liquid conductor is disposed in the lower portion of the cup 25 so that when the mercury switch 26 is in the position in which it is shown in Fig. 1 and Fig. 3 a contact is made between the cup 25 and the electrode 34.

A terminal 36 connects with the cup 25 and rises upwardly above the upper mouth of the receptacle 23. A plate of cushioning material 40 is disposed in the bottom of the chamber 22 and rests upon the bottom floor 16. A plurality of dry cells 41 are placed in the lower portion of the chamber 22 between the switch receptacle 23 and the inner shell 18. The outer casings 42 of the cells 41 constitute the terminal of the battery which is connected to the housing 11 of the buoy by means of springs 43 which are disposed in openings 44 formed in the plate 40. Each of these springs constantly presses its opposite ends against the floor 16 and against the bottom of the casing 42 of a cell 41. Holding the cells 41 downwardly against the pressure of the springs 43 is a washer 45 placed over the upper end of the switch receptacle 23. The washer 45 is held downwardly by a nut 46 which is screwed down upon threads 47 provided upon the upper end of the receptacle 23.

A screw lid 50 has provided upon the lower face thereof a threaded projection 51 which is threadedly received in the threads 19 provided in the upper end of the inner shell 18. The outer portion 52 of the lid 50 acts as a flange which presses down upon a gasket 53 which is disposed between the flange 52 and the annular upper wall 17 of the shell 11. The lid 50 has an internally threaded cylindrical wall 55 provided centrally upon the upper face thereof in which the lower open end of a globe of transparent material 56 is adapted to be threadedly received. A gasket 57 is adapted to be disposed between the globe 56 and the upper face of the lid 50 to make a fluid-tight joint between these parts.

The lid 50 is centrally apertured at 59 to receive an insulation bushing 60 which is likewise centrally apertured to receive the upper threaded rod 61 of a connecting member 62. The rod 61 is retained in its position inserted through the bushing 60 by upper and lower nuts 63. The connecting member 62 has a lower rod 65 which is spaced a given distance below the upper rod 61 and is electrically connected therewith through a flexible spring 66. The lower end of the rod 65 is slotted at 68, spring contacts 70 being mounted thereupon having fingers 71 which are disposed in the slot 68 and which diverge downwardly as shown in Fig. 1.

In the assembly of the illuminable buoy of our invention, while the lid 50 is yet unscrewed into the threads 19 at the upper end of the chamber 22, the spring 66 is extended so that the slot 68 of the rod 65 can be disposed downwardly over the upper end of the electrode 34 so that the fingers 71 of the spring contact 70 will yieldingly receive the upper end of the electrode 34, as shown in Fig. 1. The lid 50 is then screwed in place, as shown, the fingers 71 rotating about the upper end of the electrode 34 with the lid 50.

A light supporting bracket 75 has a lower foot portion 76 which is properly apertured to be received over the upper end of the rod 61 beneath the upper nut 63 and is rigidly secured thereby to the insulating bushing 60 and the lid 50. This bracket 75 is insulated from the lid 50, but forms an electrical connection through the contact member 62 with the electrode 34. Mounted upon the bracket 75 are electric bulbs 78, each of which, as shown diagrammatically in Fig. 1, has one of its contacts secured to the bracket 75 and the other of its contacts secured to a conductor 79 which is electrically connected to the lid 50 and thence to the metallic shell 11. A guard 80 formed of rods, as shown in Fig. 1, is secured to the top face of the lid 50 so as to be disposed in protecting relation to the globe 56.

The operation of our improved illuminable buoy is as follows:

The buoy as illustrated in Fig. 1 normally rests upon a suitable rack in a position inverted from that in which it is shown in Fig. 1. This will cause the mercury switch 26 to be disposed in the position in which it is shown in Fig. 4. The mercury 35 here falls downwardly by gravity into the space 32 about the projection 30, and the contact between the electrode 34 and the cup 25 is broken. This breaks the lighting circuit whereby the cells 41 are adapted to energize the lighting bulbs 78 for the purpose of illuminating the buoy 10. This lighting circuit which will be completed whenever the buoy is disposed in the position in which it is shown in Fig. 1 may be traced from a terminal 85 of the battery of cells 41 to the terminal 36 of the mercury switch 26, to the cup 25, through the mercury 35 to the electrode 34, from the electrode 34 through the contact member 62, through the light supporting bracket 75 and through the electric bulbs 78. From the bulbs 78 the circuit passes through a conductor 79 to the lid 50 and thence the circuit passes through the threaded engagement 19 to the metallic shell 11 and the springs 43 to the outer casings 42 of the cells 41 which constitute the opposite terminal of the battery of cells which is the source of electricity which energizes the bulbs 78. In this circuit the batteries are shown connected in parallel for the sake of causing them to supply energy to the bulbs 78 over the longest possible period of time before the cells 41 will be exhausted.

It will therefore be seen that we have provided an illuminable buoy of unusually simple and inexpensive construction which has the feature of being easily assembled and in which the life of the source of electricity of its illuminating means is in no way impaired while the buoy is resting in readiness for emergency use, and which need only be removed from its rest and cast into the water in order for it to function completely for carrying out the purpose for which it was built.

We claim as our invention:

1. In a device of the class described, the combination of: a shell body with an opening; means providing a source of electric current disposed in said shell body; a conductor provided upon said means; a shell head adapted to be mounted upon said body to close said opening; an electric lamp provided upon said head; an electrical connecting member extending inwardly from said shell head; and yielding lips formed upon said connecting member to form an electrical contact with said conductor when said shell head is applied to said shell body.

2. In a device of the class described, the combination of: a shell body with an opening; means providing a source of electric current disposed in said shell body; a conductor provided upon said means; a shell head adapted to be mounted upon said body to close said opening; an electric lamp provided upon said head; an electrical connecting member extending inwardly from said shell head, a section of said member intermediate of its ends being of a flexible nature; and yielding lips formed upon said connecting member to form an electrical contact with said conductor when said shell head is applied to said shell body.

In testimony whereof, we have hereunto set our hands at town of Martinez, California, this 16th day of April, 1926.

EMIL HONEGGER.
FRANCIS L. MURRAY.